United States Patent Office 2,732,827
Patented Jan. 31, 1956

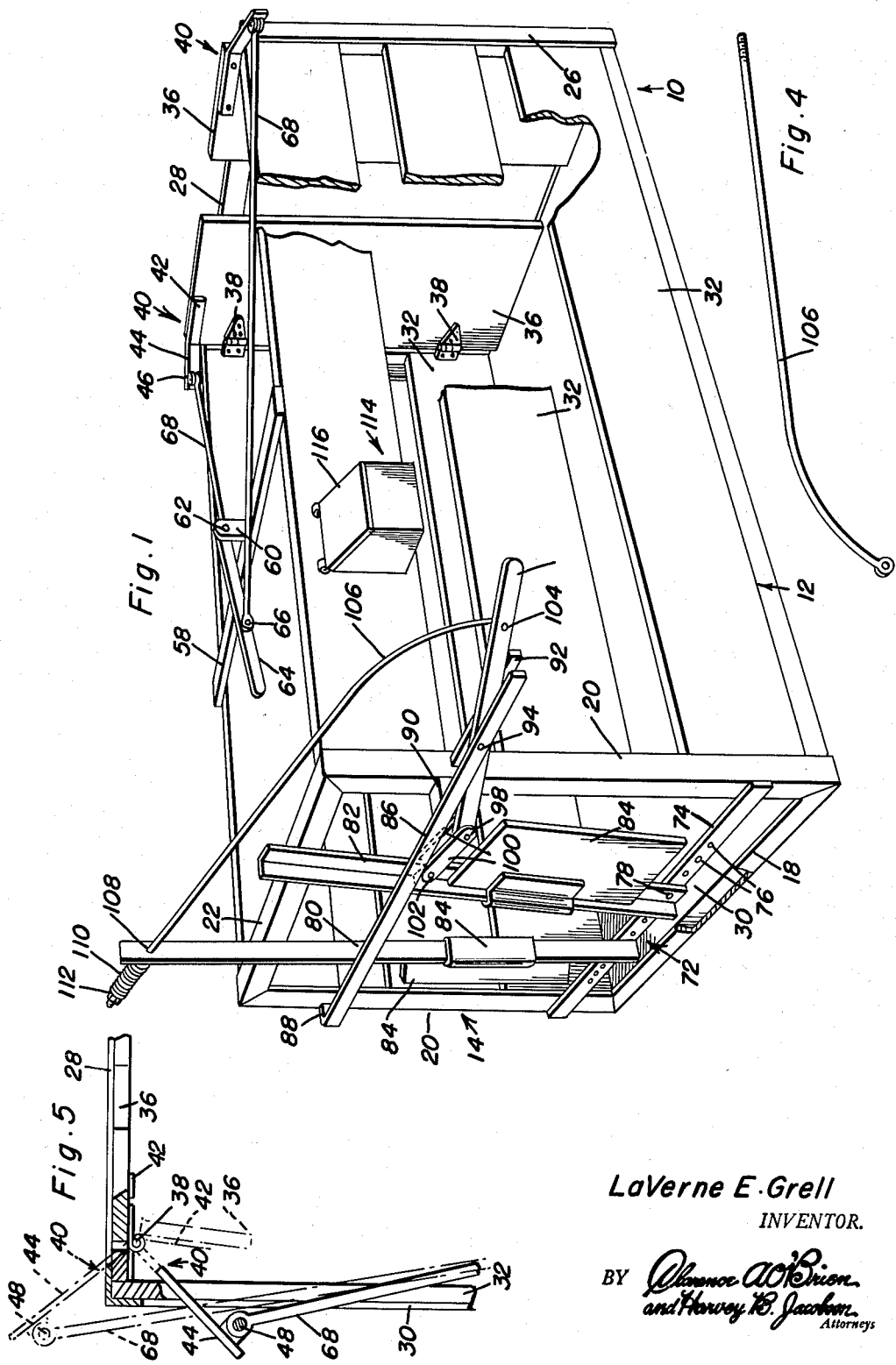

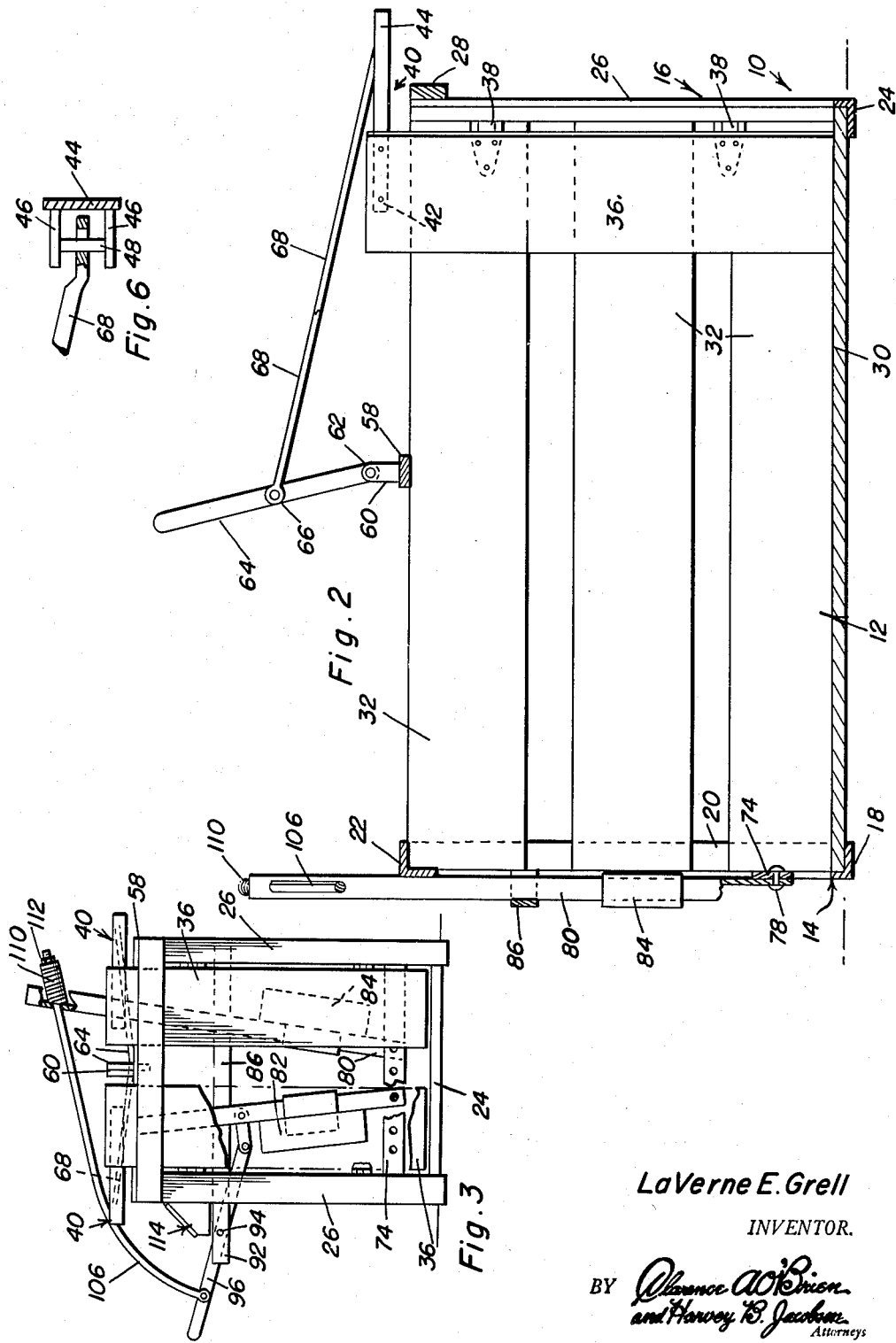

2,732,827

ADJUSTABLE GATE TYPE NECK STOCK

La Verne E. Grell, Washta, Iowa

Application June 1, 1954, Serial No. 433,588

1 Claim. (Cl. 119—99)

This invention relates in general to improvements in chute construction, and more specifically to a livestock holding chute.

The primary object of this invention is to provide a livestock holding chute which will facilitate the holding of hogs, sheep, calves or other animals while either applying rings to the noses of the hogs or to hold the various animals while taking blood tests or vaccinating the animals.

Another object of this invention is to provide an improved livestock chute which is constructed at one end whereby an animal may be easily forced therein and which is constructed at the other end with animal restraining means adapted to clamp about the neck of an animal to hold the head of the animal steady.

Still another object of this invention is to provide an improved livestock holding chute for restraining an animal in a relatively fixed position, the chute being formed of a relatively simple construction and formed of readily obtainable material so as to be economically feasible.

A further object of this invention is to provide an improved animal restraining means or neck stock for a chute construction, the animal restraining means including a pair of clamp members or stanchion bars which are pivotally mounted at their lower ends and which are connected together by linkage and so constructed whereby the bars are simultaneously moved towards each other to clamp an animal's neck therebetween.

A still further object of this invention is to provide animal restraining means or neck stock for an animal's holding chute, the restraining means including a pair of adjustably pivotally mounted clamp members which have upper portions thereof connected together by suitable linkage, the linkage including a resilient link construction so as to facilitate the holding and restraining of animals of various sizes.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a front perspective view of the livestock holding chute which is the subject of this invention and shows the same as it would appear in a livestock restraining position, the animal being omitted and a portion of the crate construction of the chute being broken away in order to clearly illustrate the details of the interior thereof;

Figure 2 is an enlarged longitudinal vertical sectional view taken adjacent the right side thereof looking from the front and facing towards the left side thereof and clearly illustrates the position of a gate for closing the rear end of the crate when in an open position;

Figure 3 is a reduced rear elevational view of the livestock holding chute, a portion of the gate closing the rear end thereof being broken away in order to clearly illustrate the relative position of clamp elements of the animal restraining means;

Figure 4 is a perspective view of a link of the linkage for the animal restraining means at the forward end of the chute;

Figure 5 is an enlarged fragmentary exploded perspective view of an upper rear corner of the chute and shows the general details of a hinge construction for the gate pivotally mounted at the rear end of the chute; and Figure 6 is an enlarged fragmentary sectional view showing the connection between one end of a rear gate link and an operator bracket carried by a rear gate element.

Referring now to the drawings in detail, it will be seen that there is illustrated the livestock holding chute which is the subject of this invention, the livestock holding chute being referred to in general by the reference numeral 10. The livestock holding chute 10 includes a crate which is referred to in general by the reference numeral 12. The crate 12 is formed of a pair of end frames which are referred to in general by the reference numerals 14 and 16, the end frame 14 being disposed at the forward end of the crate 12.

The end frame 14 includes a bottom frame member 18 and a pair of spaced parallel side frame members 20 which extend vertically from opposite ends of the bottom frame member 18. The upper ends of the side frame members 20 are connected together by a top frame member 22. It is to be noted that the various frame members forming the end frame 14 are formed of angle irons securely connected to each other.

The end frame 16 also includes a horizontally disposed bottom frame member 24. Extending upwardly from the opposite ends of the bottom frame member 24 are vertically disposed side frame members 26. The upper ends of the side frame members 26 are connected together by a horizontally disposed top frame rail 28.

The chute 12 also includes a floor 30 which extends between and is secured at the opposite ends thereof to the bottom frame members 18 and 24. The sides of the crate 12 are formed by a plurality of vertically spaced, longitudinally extending boards 32 which extend between and are secured to their respective side frame members 20 and 26.

In order to permit the entrance of livestock into the livestock holding chute 10 and to restrain them from backing out there is provided at the rear end of the crate 12 a gate construction which is referred to in general by the reference numeral 34. The gate construction 34 includes a pair of transversely spaced, vertically extending gate elements 36. Each of the gate elements 36 has secured along outer edges thereof spaced hinges 38 which are carried by an adjacent frame member 26.

Carried by the upper part of each gate element 36 and extending outwardly therefrom is an angulated operator bracket 40. The operator bracket includes a first leg 42 secured to a gate element 36 and a second leg 44 extending outwardly from the gate element 36 and at an angle to the plane thereof. Secured to the forward face of the second leg 44 and projecting forwardly therefrom is a pair of parallel ears 46. Extending between the ears 46 is a pivot pin 48.

Extending transversely between the uppermost boards 32 and rigidly secured to the upper edges thereof is a transverse bar 58. The bar 58 has secured to the upper surface thereof intermediate the ends of the bar 58 a bracket 60. Pivotally connected to the bracket 60 by a pivot pin 62 is a lever 64. The lever 64 is provided intermediate its ends with a transverse pivot pin 66 which pivotally connects to the lever 62 forward ends of links 68. The rear ends of the links 68 are pivotally connected to the legs 44 of the operator brackets 40 by the pivot pins 48.

As is best illustrated in Figure 1, the lever 64 is pivotable to a downwardly and forwardly directed position which is overcenter. Thus, it will be seen that the gate elements 36 cannot be pivoted to a chute open position when the lever 64 is so disposed. However, by pivoting the lever 64 in a clockwise direction, as viewed in Figure 1, the locking effect thereof may be overcome and it is freely pivotable about the pivot pin 62. Thus when the lever 64 is so released, an animal being forced into the crate 12 may push the gate elements 36 to open positions such as that illustrated in Figure 2.

Inasmuch as it is one of the major purposes of the livestock holding chute 10 to restrain an animal against movement so that the necessary operation may be performed thereon, there is provided at the forward end of the crate 12 and carried by the end frame 14 animal restraining means which are referred to in general by the reference numeral 72. The animal restraining means, or neck stock 72 includes a transversely extending, horizontally disposed bar 74 which extends between and is secured to lower portions of the side frame members 20. The bar 74 is provided with a plurality of apertures 76 through which are selectively passed pivot pins 78 pivotally connecting lower ends of stanchion bars or clamp members 80 and 82 thereto. The clamp members 80 and 82 extend upwardly in diverging relation from the bar 74 and are intended to clamp therebetween the neck of an animal to be restrained. It is preferred that the clamp members 80 and 82 be formed of angle iron and in order to prevent chafing of an animal's neck clamped therebetween, they are provided with sheet metal coverings 84.

Rigidly secured to lower portions of the clamp members 80 and 82 are gate elements 84. The gate elements 84 extend outwardly from the clamp members 80 and 82 and close the space between the clamp members 80 and 82 and their adjacent side frame members 20 so that an animal disposed within the crate 12 can escape only between the clamping members 80 and 82.

Carried by the upper portions of the side frame members 20 is an upper horizontally disposed bar 86. The bar 86 has a flange 88 disposed at one end thereof which is rigidly secured to its associated side frame member 20. The bar 86 extends to one side of the right hand side frame member 20, as viewed in Figure 1 and is spaced therefrom by a spacing block 90. Extending outwardly from the right hand side frame member 20 in the same vertical plane as the bar 86 but spaced rearwardly thereof in parallel relation is a bar 92.

The bars 86 and 92 have pivotally connected thereto by a pivot pin 94 an intermediate portion of a lever 96. The lever 96 has pivotally connected to an inner end thereof by a pivot pin 98 a pair of links 100. The inner ends of the links 100 are pivotally connected to the clamp member 82 by pivot pins 102.

The outer portion of the lever 96 has pivotally connected thereto by a pivot pin 104 one end of an elongated, longitudinally bent link 106. For purposes of description, the links 100 will be considered a first link whereas the link 106 will be considered a second link. The link 106 passes over the clamp member 82 and through an aperture 108 in an upper portion of the clamp member 80 which is disposed vertically above the upper end of the clamp member 82. Carried by an end portion of the link 106 is a coil spring 110 which engages the side of the clamp member 80 remote from the lever 96. The coil spring 110 is adjustably tensioned by a nut 112 threadedly engaged on the free end of the link 106.

It will be seen that the relationship of the lever 96 with respect to the links 100 and 106 is such that when the lever is swung in a clockwise direction about the pivot pin 94, as viewed in Figure 1, the links 100 will push the clamp 82 inwardly at the same time the link 106 will pull the clamp member 80 inwardly towards the clamp member 82. When the lever 96 is swung in a counter-clockwise direction, the clamp members 80 and 82 are moved apart.

In the utilization of the livestock holding chute 10, an animal is forced into the rear end of the crate 12 by permitting the gate 34 to move to the open position of Figure 2. When the animal is fully within the crate 12, the lever 64 is pulled forwardly and downwardly to a locking position such as illustrated in Figure 1. The animal is then moved forwardly to a position whereby its head sticks out between the clamp members 80 and 82 and its neck is aligned therewith. The lever 96 is then swung to the position illustrated in Figure 1 so that the clamp members 80 and 82 clampingly engage the neck of the animal to hold it in place. When an animal is so positioned, it may be provided with a ring, necessary blood tests may be taken, or it may be vaccinated as desired.

Inasmuch as the chute 10 is intended for the holding of various types of animals such as hogs, sheep and calves, it will be seen that it will be necessary for the clamp members 80 and 82 to be spaced apart at different intervals for the different animals. Thus, the pivot pins 78 are selectively positioned in the aperture 76. Once the clamp members 80 and 82 have been initially positioned, the slight variances in the size of animals will be compensated for by the coil spring 110 which will permit the slight springing apart of the clamp member 80 from the clamp member 82.

Carried by an uppermost one of the boards 82 at one side of the crate 12 is a small tool box which is referred to in general by the reference numeral 114. The tool box 114 includes a lid 116 which is hingedly mounted. The tool box may hold the necessary tools and cotter pins to make the changes on the chute for large and small animals.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the appended claim.

What is claimed as new is as follows:

A cattle chute comprising a neck stock including a rectangular end frame having vertical side members and top and bottom cross members respectively, and animal restraining means comprising a first transverse bar fixed to said side members adjacent the bottom member, a pair of upright stanchions between said side members and in front of said frame and having lower ends pivoted to said first bar for movement of said stanchions toward each other, said stanchions having upper ends extending above said top member, a second transverse bar in front of said frame below and adjacent said top member having one end fixed to one side member and its opposite end free and extending outwardly beyond the other side member, said second bar and said upper member forming guides between which the stanchions are movable, a third horizontal bar extending outwardly from said other side member behind the free end of said second bar, a horizontal operating lever for said stanchions pivoted between its ends between said third bar and said free end of the second bar and vertically swingable, a link pivoted to one stanchion and one end of the lever to operatively connect the lever to said one stanchion, and a curved rod pivoted to the other end of said lever and yieldingly connected to the upper end of the other stanchion above said top member to operatively connect said lever to said other stanchion, said rod curving upwardly over the top member and the upper end of said one stanchion to clear the same.

(References on following page)

References Cited in the file of this patent

UNITED STATES PATENTS

| | | | |
|---|---|---|---|
| 305,609 | Lower | Sept. 23, | 1884 |
| 576,541 | Brent et al. | Feb. 8, | 1897 |
| 679,431 | Simons | July 30, | 1901 |
| 902,638 | Allison | Nov. 3, | 1908 |
| 980,015 | Sheesley | Dec. 27, | 1910 |
| 1,117,996 | Galloway | Nov. 24, | 1914 |
| 1,187,217 | Wimer | June 13, | 1916 |
| 1,227,712 | Watson | May 29, | 1917 |
| 1,243,838 | Higbee | Oct. 23, | 1917 |
| 1,360,940 | Hanson | Nov. 30, | 1920 |
| 1,360,941 | Hanson | Nov. 30, | 1920 |
| 1,462,755 | Allred | July 24, | 1923 |
| 1,502,155 | O'Brien | July 22, | 1924 |
| 1,574,828 | Lucas | Mar. 2, | 1926 |
| 2,113,741 | Peterson | Apr. 12, | 1938 |
| 2,268,707 | Huckelbridge | Jan. 6, | 1942 |
| 2,529,530 | Abildgaard et al. | Nov. 14, | 1950 |
| 2,571,487 | Rolfe et al. | Oct. 16, | 1951 |
| 2,688,949 | Butts | Sept. 14, | 1954 |